United States Patent
He (10) Patent No.: US 12,408,631 B2
(45) Date of Patent: Sep. 9, 2025

(54) PET TRACTION AND DUNG PICKING INTEGRATED DEVICE

(71) Applicant: FOSHAN XINPINYUANSU TECHNOLOGY CO., LTD., Foshan (CN)

(72) Inventor: Jianming He, Foshan (CN)

(73) Assignee: FOSHAN XINPINYUANSU TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 19/200,676

(22) Filed: May 7, 2025

(65) Prior Publication Data

US 2025/0261618 A1 Aug. 21, 2025

Related U.S. Application Data

(63) Continuation of application No. PCT/CN2023/131380, filed on Nov. 14, 2023.

(30) Foreign Application Priority Data

Dec. 13, 2022 (CN) .......................... 202211609672.3

(51) Int. Cl.
*A01K 27/00* (2006.01)
*E01H 1/12* (2006.01)

(52) U.S. Cl.
CPC .......... *A01K 27/008* (2013.01); *A01K 27/004* (2013.01); *E01H 1/1206* (2013.01); *E01H 2001/1273* (2013.01)

(58) Field of Classification Search
CPC .. A01K 27/008; A01K 27/004; A01K 27/003; A01K 27/00; E01H 2001/1273
See application file for complete search history.

(56) References Cited

U.S. PATENT DOCUMENTS 5,174,620 A * 12/1992 Huegelmeyer ...... A01K 27/004
294/1.3
5,540,469 A * 7/1996 Albert .................. A01K 27/008
294/1.3
(Continued)

FOREIGN PATENT DOCUMENTS

CN 209211373 U 8/2019
CN 210827272 U 6/2020
(Continued)

OTHER PUBLICATIONS

Internation Search Report of PCT/CN2023/131380, Mailed Feb. 2, 2024.

*Primary Examiner* — Kristen C Hayes (57) ABSTRACT

A pet traction and dung picking integrated device comprises a traction rope reel, a dung picking clamp, a handle, a trigger buckle and a driving assembly. The traction rope reel is used for winding and mounting a traction rope on the traction rope reel, at least one side of the dung picking clamp is provided with an opening with a size large enough to mount the traction rope reel into the dung picking clamp or take the traction rope reel out of the dung picking clamp through the opening, the dung picking clamp is fixedly connected with the handle, the trigger buckle is rotatably mounted on the handle, the trigger buckle is connected with the driving assembly connected with the dung picking clamp, and the trigger buckle is used for driving the driving assembly to be close to or far away from the handle under an action of external force.

7 Claims, 4 Drawing Sheets

(56) References Cited

U.S. PATENT DOCUMENTS

| | | | | |
|---|---|---|---|---|
| 7,506,615 B1* | 3/2009 | Sansone | ............... | A01K 27/006 |
| | | | | 294/1.3 |
| 8,925,495 B1* | 1/2015 | Lee | ....................... | E01H 1/1206 |
| | | | | 119/796 |
| 10,738,428 B2* | 8/2020 | O'Rourke | ............ | A01K 27/004 |
| 2010/0176611 A1* | 7/2010 | Merino-Garcia | .... | A01K 27/004 |
| | | | | 294/1.3 |
| 2012/0098281 A1* | 4/2012 | Sigmund | ............. | A01K 27/008 |
| | | | | 294/1.3 |
| 2012/0256430 A1* | 10/2012 | Merino-Garcia | .... | A01K 27/004 |
| | | | | 294/1.3 |
| 2017/0159253 A1* | 6/2017 | Llobet | ................... | E01H 1/1206 |
| 2019/0320617 A1* | 10/2019 | Weatherly | ............ | A01K 27/007 |
| 2020/0060237 A1* | 2/2020 | Prudhomme | ........ | A01K 23/005 |

FOREIGN PATENT DOCUMENTS

| | | | | |
|---|---|---|---|---|
| CN | 112458989 A | | 3/2021 | |
| CN | 219108454 U | | 6/2023 | |
| DE | 29605960 U1 * | | 6/1996 | |
| DE | 29608136 U1 * | | 9/1996 | |
| DE | 10003418 A1 * | | 8/2001 | ........... E01H 1/1206 |
| DE | 102004034754 A1 * | | 2/2006 | ........... E01H 1/1206 |
| GB | 2361615 A * | | 10/2001 | ........... E01H 1/1206 |
| KR | 101975235 B1 | | 5/2019 | |
| WO | WO-03069986 A1 * | | 8/2003 | ........... A01K 27/004 |

* cited by examiner

PET TRACTION AND DUNG PICKING INTEGRATED DEVICE

CROSS-REFERENCE TO RELATED APPLICATIONS

This application is a continuation of International Patent Application No. PCT/CN2023/131380 with a filing date of Nov. 14, 2023, designating the United States, now pending, and further claims priority to Chinese Patent Application No. 202211609672.3 with a filing date of Dec. 13, 2022. The content of the aforementioned applications, including any intervening amendments thereto, are incorporated herein by reference.

TECHNICAL FIELD

The present invention relates to the technical field of pet care products, and is particularly a pet traction and dung picking integrated device.

BACKGROUND OF THE PRESENT INVENTION

At present, in the market of pet care products, existing traction rope for restraining pets and dung picking clamp are two independent products, which exist independently in use. When users take their pets for a walk, they need to carry these two products, which is inconvenient for the users to carry, thereby bringing very unfriendly experience to the users, and leading to low user experience. Therefore, it is desirable to integrate the two functions of traction and dung picking to obtain a product device.

SUMMARY OF THE PRESENT INVENTION

Aiming at the defects in the prior art, the present invention is intended to provide a pet traction and dung picking integrated device, which can solve the problem described in the background.

The technical solution for achieving the objective of the present invention is as follows: a pet traction and dung picking integrated device comprises a traction rope reel, a dung picking clamp and a handle, wherein the traction rope reel is used for winding and mounting a traction rope, at least one side of the dung picking clamp is provided with an opening, a size of the opening is large enough to mount the traction rope reel into the dung picking clamp or take the traction rope reel out of the dung picking clamp through the opening, the dung picking clamp is fixedly connected with the handle, the traction rope reel is mounted in a cavity of the dung picking clamp, the dung picking clamp is connected with the handle, and the dung picking clamp is used for picking up pet dung.

Further, the dung picking clamp comprises a first dung picking sheet and a second dung picking sheet which are oppositely arranged, the cavity is formed between the first dung picking sheet and the second dung picking sheet, and the opening is formed at top ends of the first dung picking sheet and the second dung picking sheet.

Further, the traction rope reel is also connected with the handle through a connecting rod, one end of the connecting rod is connected with the traction rope reel, the other end of the connecting rod is rotatably mounted on the handle, and the connecting rod is rotatable relative to the handle.

Further, the handle comprises a first handle sheet and a second handle sheet which are oppositely arranged, an annular cavity is formed between the first handle sheet and the second handle sheet, and one end of the connecting rod extends into the annular cavity and is rotatably mounted in the annular cavity.

Further, the opening extends along one side end of the dung picking clamp to be spread all over the whole side end, or, the opening is located at a transition position between the side end of the dung picking clamp and the other end of the dung picking clamp close to the handle, an opening part located at the side end of the dung picking clamp is recorded as a first opening part, so that when the dung picking clamp is in a closed state, a remaining part of the side end where the opening is located except the first opening part is in a closed state or the remaining part keeps a gap, and a size of the gap is not large enough for target dung in the cavity of the dung picking clamp to fall out through the gap.

Further, one end of the trigger buckle comprises a buckle protrusion, the other end of the trigger buckle comprises a rotating protrusion, the buckle protrusion is rotatably mounted on the handle through a pin shaft, and the rotating protrusion is connected with the driving assembly.

Further, the handle further comprises a fixed rod and a protruding rail box, the fixed rod is located between the connecting rod and the protruding rail box, the connecting rod and the fixed rod are arranged at an interval, the connecting rod is located at an upper portion of one side of the handle, the fixed rod is located at a middle portion of the same side of the handle, the protruding rail box is located at a lower portion of the same side of the handle, and the protruding rail box protrudes towards the dung picking clamp.

Further, the driving assembly comprises a moving rod and an opening and closing clip, the opening and closing clip is an arc-shaped elastic sheet, one end of the moving rod is connected with a rotating protrusion of the trigger buckle, one end of the moving rod is provided with a through hole, the rotating protrusion penetrates through the through hole, the other end of the moving rod is fixedly connected with the opening and closing clip, two arc-shaped ends of the opening and closing clip are respectively connected with two dung picking sheets of the dung picking clamp, one part of the moving rod extends into the protruding rail box to be connected with the trigger buckle, and the other part of the moving rod is located outside the protruding rail box.

Further, the handle is annular, the middle portion of the handle is provided with an annular through hole for a hand to hold the handle and pull the trigger buckle conveniently, and the trigger buckle located outside the annular cavity is located in the annular through hole.

The present invention has the beneficial effects as follows: according to the present invention, the traction rope with a traction function and the dung picking clamp with a cleaning function are integrated, so that a user only needs to carry one device to take a pet for a walk, and the user carries the device conveniently, thereby bringing better experience to the user. Moreover, the whole structure makes the operation easy and simple, and the user only needs to press the trigger buckle with a finger to clean up the pet dung, and only needs to take one end of the traction rope out of the opening and tie the traction rope on the pet to realize the traction of the pet.

In the drawings, 1 refers to traction rope reel, 2 refers to connecting rod, 3 refers to handle, 4 refers to trigger buckle, 41 refers to buckle protrusion, 42 refers to rotating protrusion, 5 refers to dung picking clamp, 6 refers to fixed rod, 7 refers to moving rod, 71 refers to through hole, and 8 refers to opening and closing clip.

DETAILED DESCRIPTION OF PREFERRED EMBODIMENTS

The present invention is further described hereinafter with reference to the drawings and specific embodiments.

Embodiment 1

As shown in FIG. 1 to FIG. 4, a pet traction and dung picking integrated device comprises a traction rope reel 1, a connecting rod 2, a dung picking clamp 5, a handle 3, a trigger buckle 4 and a driving assembly. The traction rope reel 1 is used for winding and mounting a traction rope on the traction rope reel 1, the traction rope reel 1 is movably mounted in a cavity of the dung picking clamp 5, and at least one side of the dung picking clamp 5 is provided with an opening 9, so that the traction rope reel 1 may enter the cavity of the dung picking clamp 5 through the opening 9, and the traction rope reel 1 is mounted into and taken out of the cavity of the dung picking clamp 5. The traction rope reel 1 is connected with one end of the connecting rod 2, the other end of the connecting rod 2 is rotatably mounted on the handle 3, and the connecting rod 2 is rotatable relative to the handle 3, so that the traction rope reel 1 is mounted into the dung picking clamp 5 or taken out of the dung picking clamp 5 by rotating the connecting rod 2.

The dung picking clamp 5 comprises a first dung picking sheet and a second dung picking sheet which are oppositely arranged, the cavity is formed between the first dung picking sheet and the second dung picking sheet, and the opening 9 is formed at top ends of the first dung picking sheet and the second dung picking sheet.

In this embodiment, the opening 9 is distributed along the top end of the dung picking clamp 5, and spread all over the whole top end to form the elongated opening 9, that is, the opening extends along top end edges of the first dung picking sheet and the second dung picking sheet to form the elongated opening 9.

The handle 3 comprises a first handle sheet and a second handle sheet which are oppositely arranged, an annular cavity is formed between the first handle sheet and the second handle sheet, and one end of the connecting rod 2 extends into the annular cavity and is rotatably mounted in the annular cavity. One end of the connecting rod 2 may be rotatably mounted in the annular cavity through a pin shaft, so that the connecting rod 2 is rotatable relative to the handle 3, so as to withdraw or put down the connecting rod 2 by rotating the handle 3, thereby mounting or taking out the traction rope reel 1.

The trigger buckle 4 is rotatably mounted on the handle 3, and the trigger buckle 4 may be rotatably mounted on the handle 3 through the pin shaft. Moreover, one part of the trigger buckle 4 is located in the annular cavity, and the other part of the trigger buckle is located outside the annular cavity. The trigger buckle 4 is connected with the driving assembly, the driving assembly is connected with the dung picking clamp 5, and the trigger buckle 4 is used for driving the driving assembly to be close to or far away from the handle 3, so that the driving assembly drives the dung picking clamp 5 to be opened or closed. When the trigger buckle 4 is pulled, the trigger buckle 4 compresses a spring (not shown in the figures) mounted in the annular cavity, and the trigger buckle 4 retracts into the annular cavity, so as to drive the driving assembly to be close to the handle 3, and the two dung picking sheets (the first dung picking sheet and the second dung picking sheet) of the dung picking clamp 5 are far away from each other to be opened, so that the dung picking clamp 5 is opened; and on the contrary, when the trigger buckle 4 is released, the trigger buckle 4 is subjected to a rebound force of the spring, and the trigger buckle 4 extends and moves out of the annular cavity, so as to drive the driving assembly to move away from the handle 3, and then the driving assembly drives the two dung picking sheets of the dung picking clamp 5 to be close to each other, so that the dung picking clamp is closed. By pulling or releasing the trigger buckle 4, the dung picking clamp 5 may be operated to be opened and closed.

One end of the trigger buckle 4 comprises a buckle protrusion 41, the other end of the trigger buckle 4 comprises a rotating protrusion 42, the buckle protrusion 41 is rotatably mounted on the handle 3 through the pin shaft, and the rotating protrusion 42 is connected with the driving assembly, so that the trigger buckle 4 is connected with the driving assembly.

In one optional embodiment, a lower end of the opening 9 close to the handle 3 is provided with a concave bayonet, so that the connecting rod 2 is located in the opening 9 and locked in the bayonet, so as to fix the connecting rod 2 in the opening 9, thereby firmly mounting the traction rope reel 1 into the cavity. For example, the connecting rod 2 may be detachably mounted in the opening 9 through a buckle structure, so that the connecting rod 2 may be movably mounted in the opening 9 of the dung picking clamp 5.

In another optional embodiment, the handle 3 further comprises a fixed rod 6 and a protruding rail box, the fixed rod 6 is located between the connecting rod 2 and the protruding rail box, the connecting rod 2 is located at an upper portion of one side of the handle 3, the fixed rod 6 is located at a middle portion of the same side of the handle 3, the protruding rail box is located at a lower portion of the same side of the handle 3, and the protruding rail box protrudes towards the dung picking clamp 5.

The driving assembly comprises a moving rod 7 and an opening and closing clip 8, the opening and closing clip 8 is an arc-shaped elastic sheet, one end of the moving rod 7 is connected with the rotating protrusion 42 of the trigger buckle 4, one end of the moving rod 7 is provided with a through hole 71, and the rotating protrusion 42 penetrates through the through hole 71, so that the trigger buckle 4 is connected with the moving rod 7. The other end of the moving rod 7 is fixedly connected with the opening and closing clip 8, and two arc-shaped ends of the opening and closing clip 8 are respectively connected with two dung picking sheets of the dung picking clamp 5. One part of the moving rod 7 extends into the protruding rail box to be connected with the trigger buckle 4, and the other part of the moving rod is located outside the protruding rail box.

In one optional embodiment, a plurality of limiting blocks are arranged in the protruding rail box, the limiting blocks are arranged along an axial direction of the protruding rail box and arranged in an upper layer and a lower layer, and the moving rod 7 is located between the limiting blocks arranged in the upper layer and the lower layer, so that the moving rod 7 always keeps moving horizontally when the moving rod 7 is close to or far away from the handle 3, that is, the limiting blocks play the role of limiting the moving rod 7.

In another optional embodiment, the handle 3 is annular, and may be a round, an oval or other irregular rings. The middle portion of the handle 3 is provided with the annular through hole 71, the trigger buckle 4 located outside the annular cavity is located in the annular through hole 71, and the annular through hole 71 is used for a hand to hold the handle 3 conveniently and used for a finger for pulling the trigger buckle 4 to pull the trigger buckle 4 better.

In another optional embodiment, the connecting rod 2 and the fixed rod 6 are arranged at an interval, and an interval distance between the connecting rod 2 and the fixed rod 6 is relatively large, so that the hand may fully grasp the connecting rod 2 to facilitate operating the connecting rod 2.

In another optional embodiment, one end of the fixed rod 6 close to the dung picking clamp 5 is provided with two pin shafts, the two pin shafts are arranged at an interval, one pin shaft is connected with the first dung picking sheet of the dung picking clamp 5, and the other pin shaft is connected with the second dung picking sheet, so that the two dung picking sheets of the dung picking clamp 5 are rotatable relative to the fixed rod 6. Therefore, in the process that the driving assembly drives the dung picking clamp 5 to be opened or closed, the dung picking clamp 5 may be opened or closed relative to the fixed rod 6.

In actual use, the connecting rod 2 is rotated by the hand to take out the traction rope reel 1 in the cavity of the dung picking clamp 5, then the traction rope is wound on the traction rope reel 1, and then one end of the traction rope wound on the traction rope reel 1 in advance is extended out of the opening 9 by the hand, so that the traction rope may be tied on the pet, and the connecting rod 2 is buckled in the bayonet of the opening again. When it is necessary to clean the pet dung, the hand holds the handle 3 and the finger (such as an index finger) pulls the trigger buckle 4, the trigger buckle 4 drives the moving rod 7 to move towards the handle 3, the moving rod 7 drives two ends of the arc-shaped opening and closing clip 8 to be close to each other and follow the moving rod 7 to move towards the handle 3, two ends of the opening and closing clip 8 are close to each other to drive the two dung picking sheets to open, then the whole dung picking clamp 5 is placed on target dung, then the trigger buckle 4 is released, and the two dung picking sheets are quickly closed, so that the target dung may be clamped in the cavity of the dung picking clamp 5 to finish dung cleaning.

According to the present invention, the traction rope with a traction function and the dung picking clamp 5 with a cleaning function are integrated, so that a user only needs to carry one device to take a pet for a walk, and the user carries the device conveniently, thereby bringing better experience to the user. Moreover, the whole structure makes the operation easy and simple, and the user only needs to press the trigger buckle 4 with a finger to clean up the pet dung, and only needs to take one end of the traction rope out of the opening 9 and tie the traction rope on the pet to realize the traction of the pet.

Embodiment 2

Figure 1:
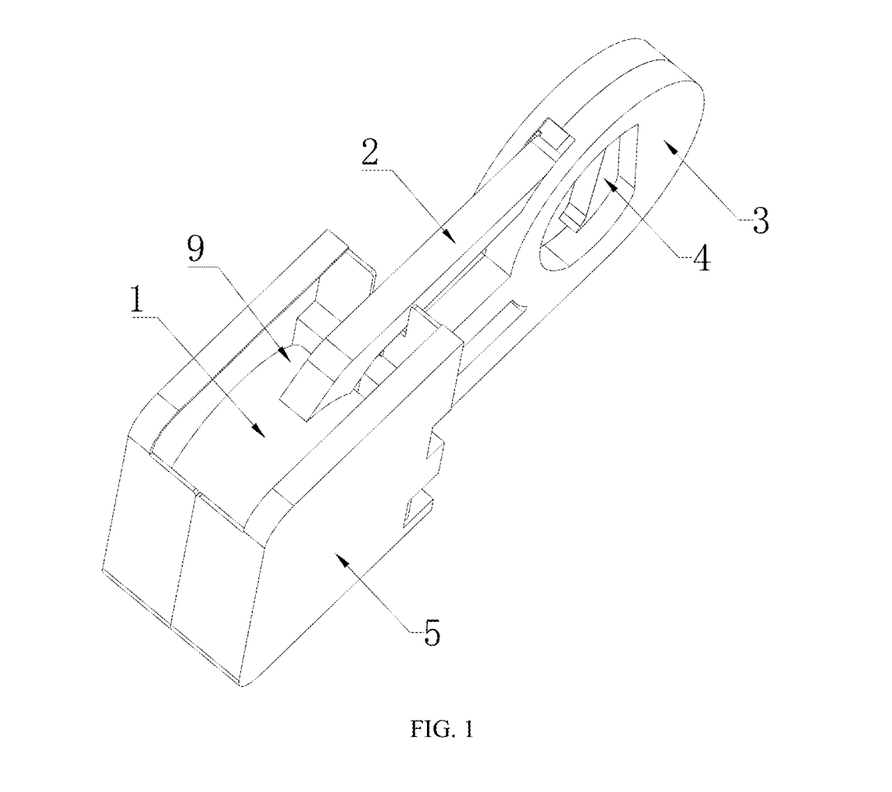
FIG. 1 is a schematic structural diagram of Embodiment 1.
Figure 2:
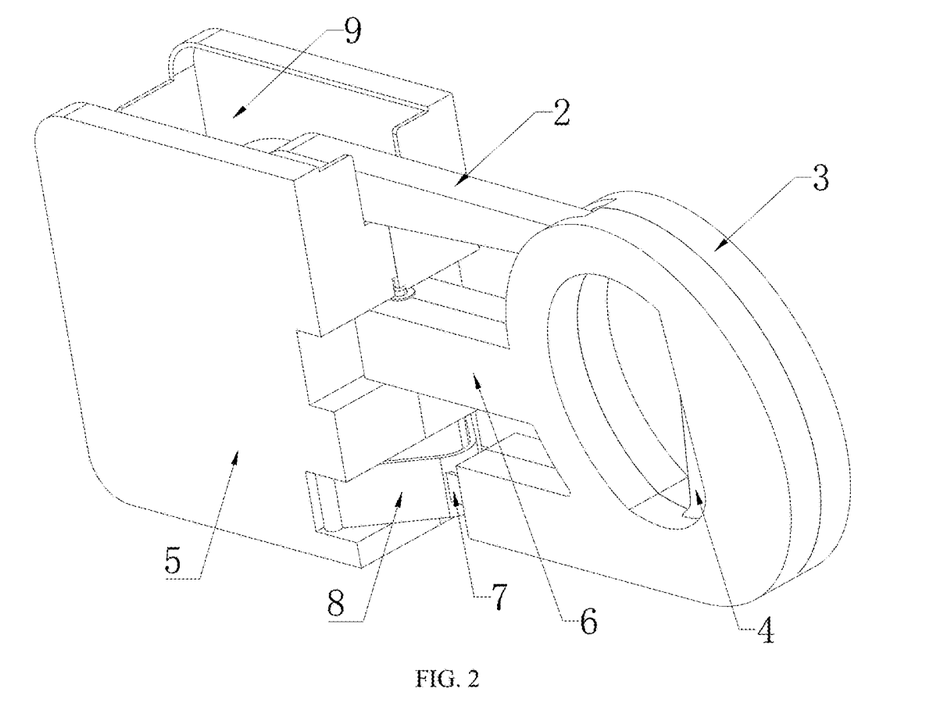
FIG. 2 is a schematic structural diagram of Embodiment 1 from another perspective.
Figure 3:
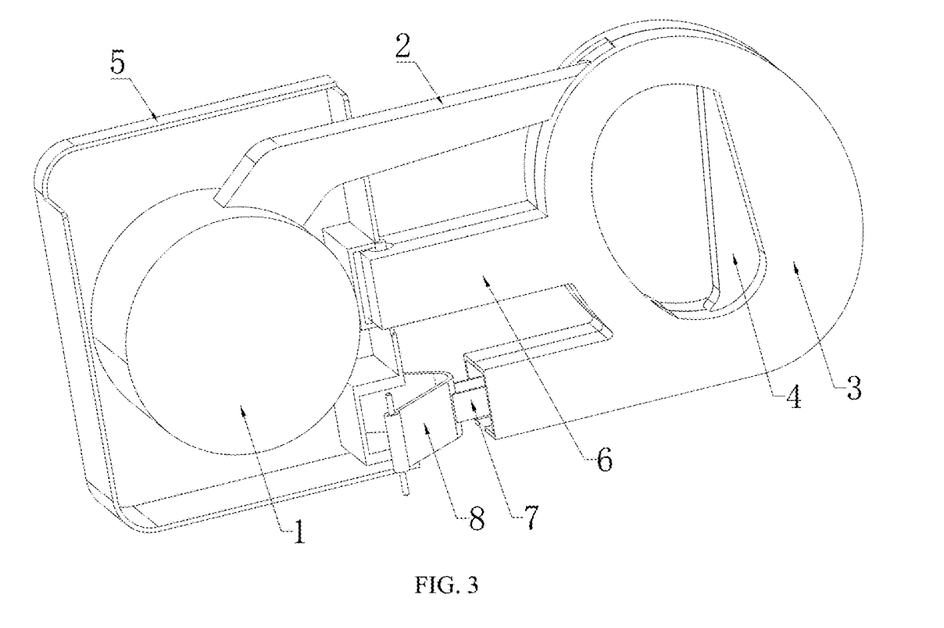
FIG. 3 is a schematic structural diagram of Embodiment 1 after a first dung picking sheet is hidden.
Figure 4:
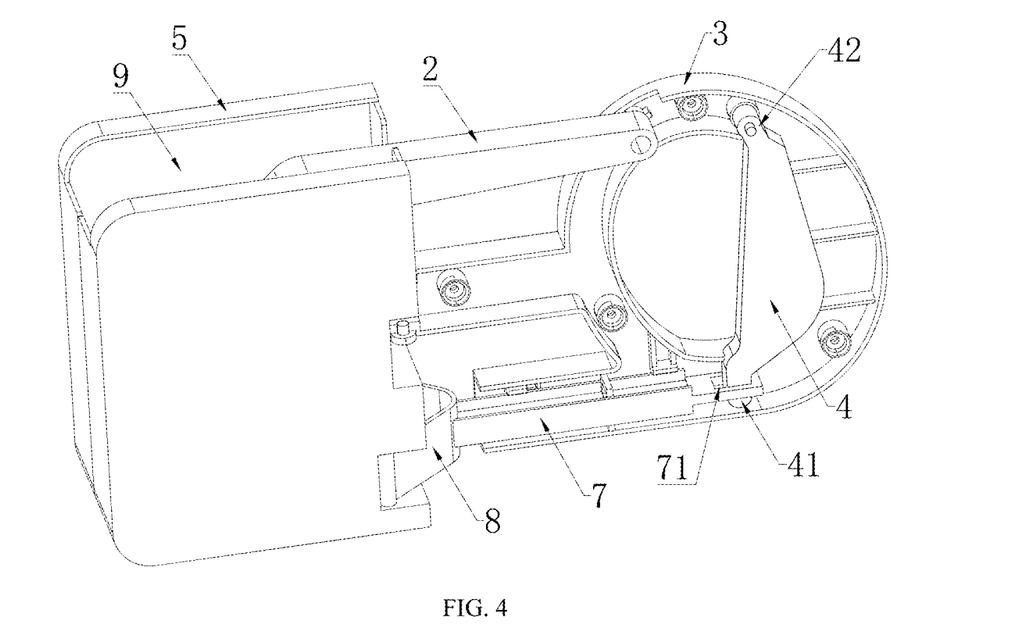
FIG. 4 is a schematic structural diagram of Embodiment 1 after a first handle sheet is hidden.
Figure 5:
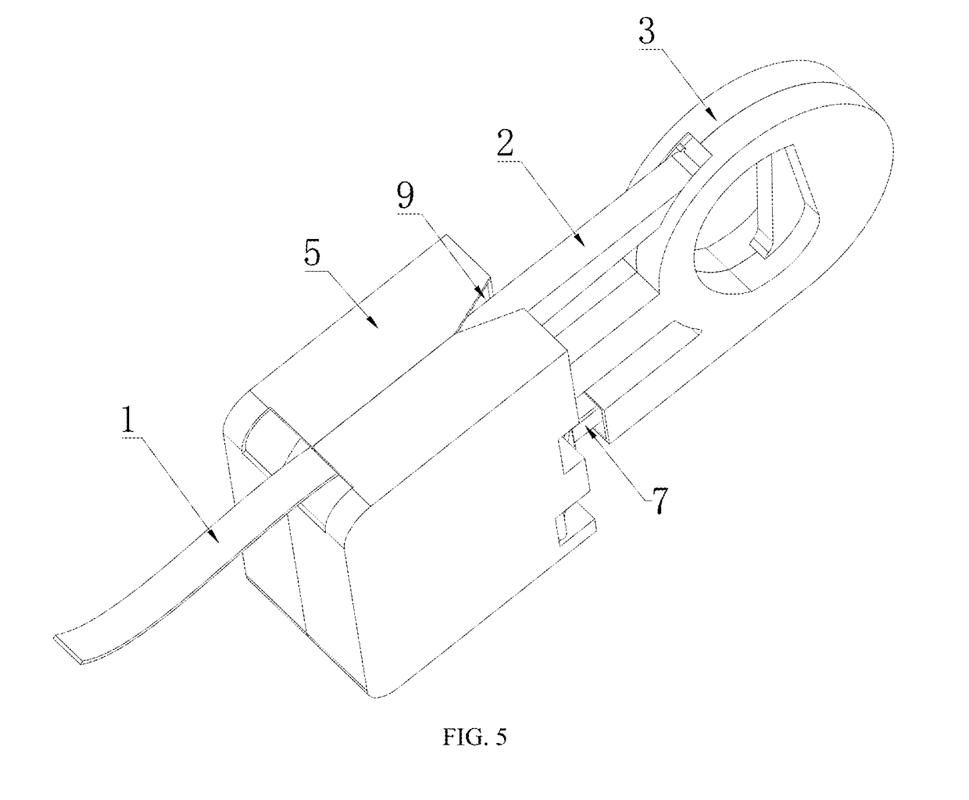
FIG. 5 is a schematic diagram showing that a dung picking clamp is in a closed state to drive a side end where an opening is located to be also in a closed state in Embodiment 2.
Figure 6:
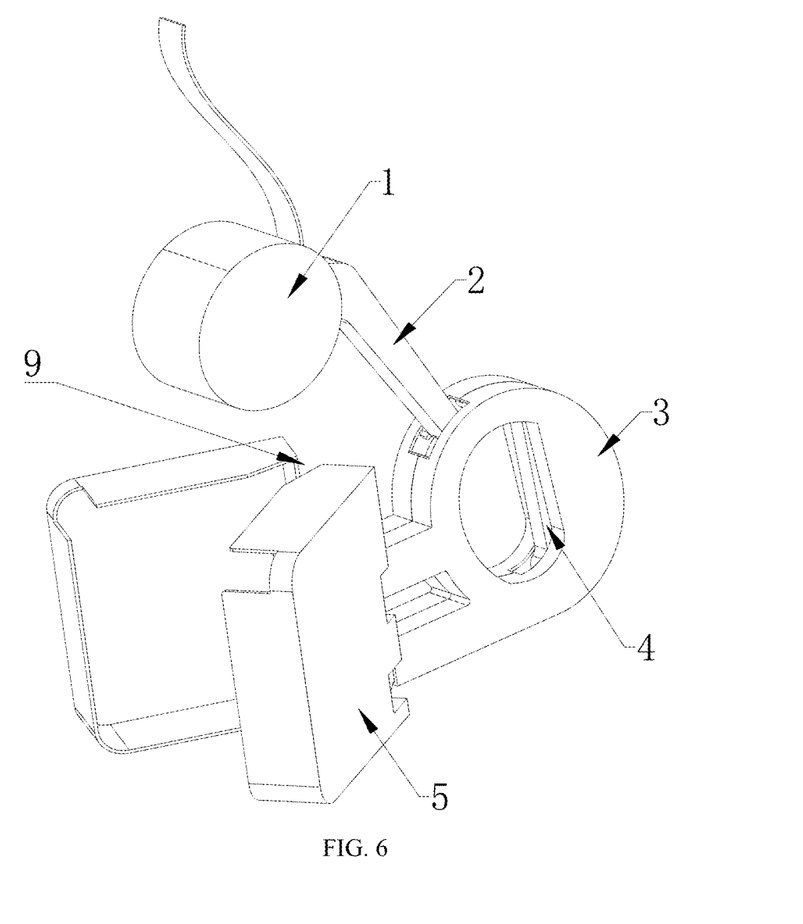
FIG. 6 is a schematic diagram showing that the dung picking clamp is in an open state to drive the side end where the opening is located to be also in an open state in Embodiment 2.

With reference to FIG. 5 and FIG. 6, in Embodiment 1, the opening 9 is distributed along the top end of the dung picking clamp 5. In actual use, one side of the two dung picking sheets of the dung picking clamp 5 is opened to pick up the target dung into the cavity of the dung picking clamp 5 and the opening at the side end of the dung picking clamp is closed, and then the target dung in the cavity of the dung picking clamp 5 may fall out of the opening 9 at the side end of the dung picking clamp, thereby causing inconvenience to a user. Therefore, the opening 9 in Embodiment 1 needs to be improved. With reference to FIG. 5 and FIG. 6, the opening 9 is located at a transition position between the top end (which does not mean the top end in actual use by taking the vision of the figures as an example) of the dung picking clamp 5 and one end of the dung picking clamp 5 close to the handle 3, and the opening at the top end of the dung picking clamp 5 is V-shaped, so that when the dung picking clamp 5 is in a closed state, the remaining part of the dung picking clamp except the V-shaped part is also in a closed state, so as to avoid the target dung in the cavity of the dung picking clamp 5 from falling out from the side end where the opening 9 is located when the dung picking clamp 5 is in the closed state.

It should be noted that the description that the remaining part of the dung picking clamp except the V-shaped part is in the closed state herein means that the target dung cannot fall out from the side end of the dung picking clamp 5 where the opening 9 is located, which does not require completely sealed closure. For example, even if the side end where the opening 9 is located keeps a very small gap, the target dung will not fall out from the side end where the opening 9 is located.

One side of the top end of the dung picking clamp 5 where the V-shaped part of the opening 9 is located far away from the opening is further provided with an outlet, and the traction rope on the traction rope reel 1 can extend from the outlet, so that the traction rope may be tied on the pet. The traction rope may or may not be adapted to a shape of the outlet, and the traction rope may or may not be in contact with the outlet. Because the traction rope is usually small in size, such as being a sheet or a round strip, the outlet may also be made very small, so that the target dung will not fall out of the outlet.

Embodiment 3

In Embodiment 1 and Embodiment 2, the opening 9 for mounting and taking out the traction rope reel 1 and the opening for picking up the target dung by the dung picking clamp 5 are two different openings. With reference to FIG. 6, when a leftmost end of the dung picking clamp 5 forms an opening in an open state in FIG. 6, the opening is used for picking up the target dung, and is different from the opening at the top end of the dung picking clamp 5, that is, the openings are not the same opening.

Compared with Embodiment 1 and Embodiment 2, in this embodiment, the opening for mounting and taking out the traction rope reel 1 and the opening for picking up the target dung are the same opening, that is, the top end of the dung picking clamp 5 is not provided with the opening, and the traction rope reel 1 is also mounted into and taken out of the cavity of the dung picking clamp 5 through the opening for picking up the target dung. At this time, the traction rope reel 1 may be mounted or taken out independently by the hand without using the connecting rod 2.

The embodiment disclosed in the specification is only an example of unilateral feature of the present invention, the scope of protection of the present invention is not limited to the embodiment, and any other functionally equivalent embodiments all fall within the scope of protection of the present invention. For those skilled in the art, various other corresponding changes and deformations may be made according to the technical solutions and concepts described above, and all these changes and deformations should fall within the scope of protection of the claims of the present invention.

I claim:

1. A pet traction and dung picking integrated device, comprising a traction rope reel, a dung picking clamp and a handle, wherein a traction rope is wound and mounted on the traction rope reel, the dung picking clamp is opened and closed for picking up pet dung, the dung picking clamp is connected with the handle, and
    the traction rope reel is mounted in a cavity of the dung picking clamp; and
    further comprising a trigger buckle and a driving assembly, wherein the trigger buckle is rotatably mounted on the handle, the trigger buckle is connected with the driving assembly, the driving assembly is connected with the dung picking clamp, and the trigger buckle is used for driving the driving assembly to move linearly to be movable along the handle under an action of external force, so that the driving assembly drives the dung picking clamp to be opened or closed;
    the traction rope reel is connected with the handle through a connecting rod, one end of the connecting rod is connected with the traction rope reel, the other end of the connecting rod is rotatably mounted on the handle, and the connecting rod is rotatable relative to the handle;
    the handle further comprises a fixed rod and a protruding rail box, the fixed rod is located between the connecting rod and the protruding rail box, the connecting rod and the fixed rod are arranged at an interval, the connecting rod is located at an upper portion of one side of the handle, the fixed rod is located at a middle portion of the same side of the handle, the protruding rail box is located at a lower portion of the same side of the handle, and the protruding rail box protrudes towards the dung picking clamp; and
    the driving assembly comprises a moving rod and an opening and closing clip, the opening and closing clip is an arc-shaped elastic sheet, one end of the moving rod is connected with a rotating protrusion of the trigger buckle, one end of the moving rod is provided with a through hole, the rotating protrusion penetrates through the through hole, the other end of the moving rod is fixedly connected with the opening and closing clip, two arc-shaped ends of the opening and closing clip are respectively connected with two dung picking sheets of the dung picking clamp, one part of the moving rod extends into the protruding rail box to be connected with the trigger buckle, the other part of the moving rod is located outside the protruding rail box, the handle is annular, the middle portion of the handle is provided with an annular through hole for a hand to hold the handle and pull the trigger buckle conveniently, and the trigger buckle is located in the annular through hole.

2. The pet traction and dung picking integrated device according to claim 1, wherein the dung picking clamp comprises a first dung picking sheet and a second dung picking sheet which are oppositely arranged, the cavity is formed between the first dung picking sheet and the second dung picking sheet, and when the dung picking clamp is in an open state, a size of an opening formed by the first dung picking sheet and the second dung picking sheet is of a size to permit mounting the traction rope reel into the dung picking clamp or take the traction rope reel out of the dung picking clamp through the opening, and the opening is the same as a dung opening used for picking up the pet dung by the dung picking clamp.

3. The pet traction and dung picking integrated device according to claim 1, wherein at least one side of the dung picking clamp is provided with an opening, a size of the opening is of a size to permit mounting the traction rope reel into the dung picking clamp or take the traction rope reel out of the dung picking clamp through the opening, and the opening is different from a dung opening used for picking up the pet dung by the dung picking clamp.

4. The pet traction and dung picking integrated device according to claim 3, wherein top ends of the first dung picking sheet and the second dung picking sheet are spaced apart from each other when the dung picking clamp is completely opened to enlarge the opening, the enlarged opening is of a size to permit mounting the traction rope reel into the dung picking clamp or taken the traction rope reel out of the dung picking clamp through the opening, and the dung picking clamp is fixedly connected with the handle.

5. The pet traction and dung picking integrated device according to claim 4, wherein the opening extends along one side end of the dung picking clamp to be spread all over the whole side end,
    or, the opening is located at a transition position between the side end of the dung picking clamp and the other end of the dung picking clamp adjacent to the handle, an opening part located at the side end of the dung picking clamp is designed as a first opening part, so that when the dung picking clamp is in a closed state, a remaining part of the side end where the opening is located except the first opening part is in a closed state or the remaining part of the side end where the opening is located except the first opening part keeps a gap, and the gap is dimensioned to prevent collected target dung within the cavity of the dung picking clamp from escaping therethrough.

6. The pet traction and dung picking integrated device according to claim 3, wherein the opening extends along one side end of the dung picking clamp to be spread all over the whole side end,
    or, the opening is located at a transition position between the side end of the dung picking clamp and the other end of the dung picking clamp adjacent to the handle, an opening part located at the side end of the dung picking clamp is designed as a first opening part, so that when the dung picking clamp is in a closed state, a remaining part of the side end where the opening is located except the first opening part is in a closed state or the remaining part of the side end where the opening is located except the first opening part keeps a gap, and the gap is dimensioned to prevent collected target dung within the cavity of the dung picking clamp from escaping therethrough.

7. The pet traction and dung picking integrated device according to claim 1, wherein the handle comprises a first handle sheet and a second handle sheet which are oppositely arranged, an annular cavity is formed between the first handle sheet and the second handle sheet, and one end of the connecting rod extends into the annular cavity and is rotatably mounted in the annular cavity.

* * * * *